United States Patent [19]
Short

[11] 3,986,038
[45] Oct. 12, 1976

[54] SEQUENCER UNIT

[75] Inventor: David J. Short, Klemzig, Australia

[73] Assignee: Gibson Battle & Co. Limited, Australia

[22] Filed: Apr. 2, 1975

[21] Appl. No.: 564,283

[30] Foreign Application Priority Data
  Apr. 8, 1974  Australia............................ 7183/74

[52] U.S. Cl.................................... 307/47; 307/75; 307/80; 307/86
[51] Int. Cl.² .......................................... H02J 3/38
[58] Field of Search........... 290/30 R, 30 A; 307/43, 307/44, 47, 60, 61, 62, 63, 72, 75, 76, 80, 81, 84, 85, 86, 87, 125, 126, 130

[56] References Cited
UNITED STATES PATENTS

| | | |
|---|---|---|
| 3,235,743 | 2/1966 | Ryerson et al.................... 307/81 X |
| 3,300,647 | 1/1967 | Gogia et al. ...................... 307/84 X |
| 3,609,388 | 9/1971 | Hemmenway et al. ......... 307/130 X |
| 3,703,663 | 11/1972 | Wagner............................. 307/86 X |

*Primary Examiner*—A. D. Pellinen
*Attorney, Agent, or Firm*—Kinzer, Plyer, Dorn & McEachran

[57] ABSTRACT

An automatic control system for a plurality of engine-driven alternator units arranged to supply a common electrical distribution system, the system monitoring the level of the load on each generating set so that a load analogue signal corresponds to the proportion of its load that its alternator is producing.

4 Claims, 3 Drawing Figures

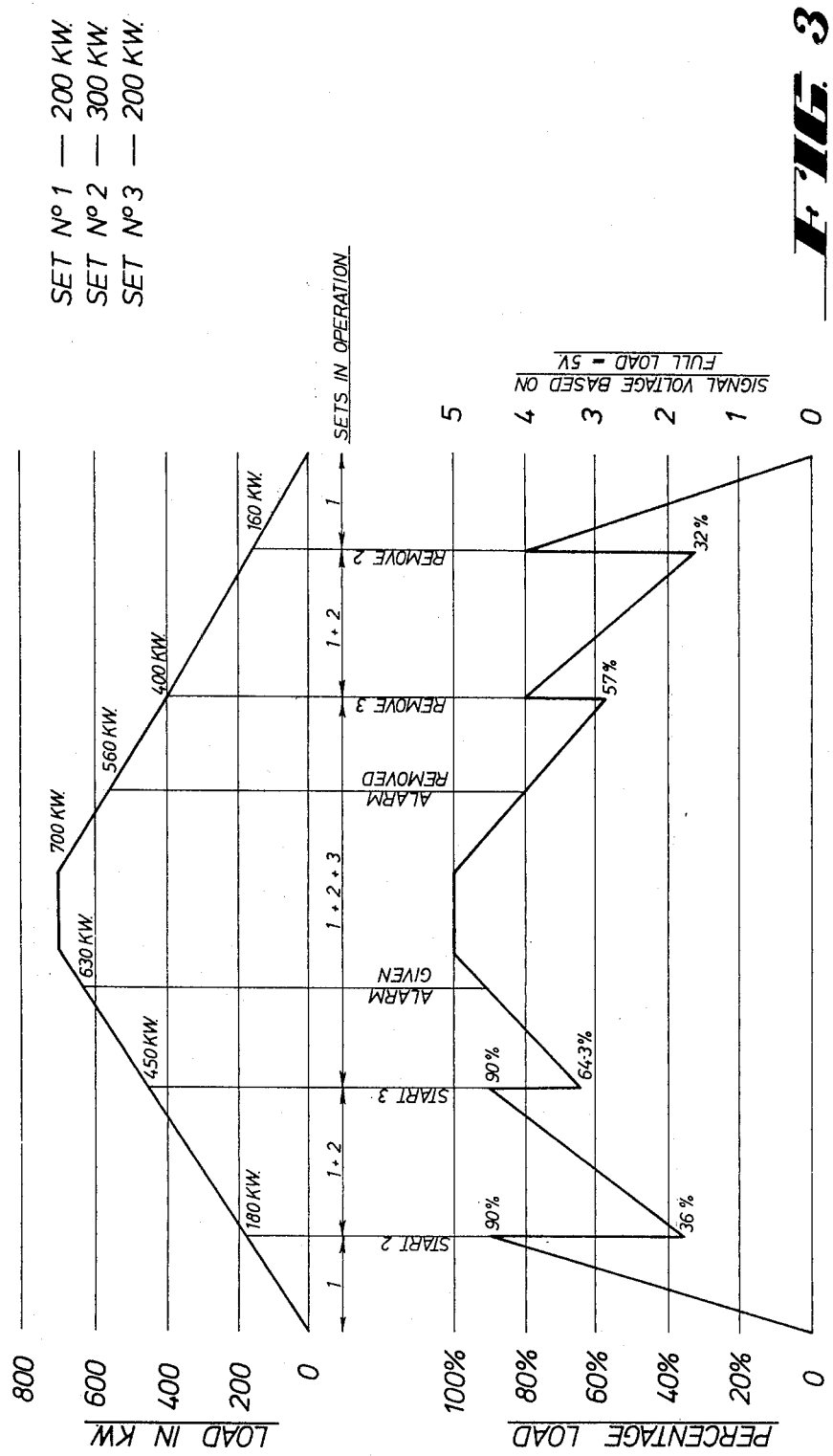

SEQUENCER UNIT

The present invention relates to a control system that is adapted to automatically add and remove engine powered alternator units from common electrical distribution systems supplying electrical power for various uses. Whilst it may be expected that the units in a system will be of substantially the same capacity, the invention is capable of adding and removing units of widely varying capacity, yet ensuring that the load imposed on the remaining units when a unit is removed is in proportion to their size regardless of the size of the unit removed.

Currently available control systems measure the load on the total distribution system and add or remove alternators according to a programmed pattern. If a new alternator is installed, or an existing unit removed, the control system must be re-programmed to suit. Additionally, if an additional alternator or alternators are installed, it may be necessary to purchase a new controller if the number of alternators now exceeds the number of stations of the controller.

The cost of such controllers is often such as to be prohibitive when considered for small power networks, and yet it is these networks which often have the greatest need for automatic control because of the lack of fully qualified staff, and the cost of manning the station continually.

The major difference between the present invention and currently available systems is that the latter measure the total power being supplied to the bus by the alternator units, and start and stop units according to the actual power demand. This can impose problems where units of differing capacities are installed, and one or more units fail to start when required. It is difficult for the logic to adjust to these situations, as the generating capacity available does not now correspond to the programme.

The present invention measures the power being delivered as a proportion of the capacity of the alternator units which are operating, for the purpose of load increase. When the load reaches a set proportion of the capacity of the operating units, a signal is given to start another unit. Should this unit fail to start, the signal is normally passed to the following unit by the control circuits, and the faulty unit does not, for the purposes of the logic, form part of the system.

In fact no unit forms part of the logic system until it is operating on line. The logic only sees the operating units and the load, and compares them as a proportion. Thus it is "self-programming".

To determine when excess capacity exists, the logic also compares the power being delivered with the capacity of the operating units with the exception of the next unit to shut down. When the load falls below a set proportion of the said capacity (this proportion being less than the proportion required on load increase, to prevent "hunting") the selected unit is shut down.

The signal levels throughout the system reflect only the proportion of the load to the capacity of the operating units and the capacity of the operating units less the next unit to shut down, regardless of whether the system as a whole is operating at near maximum or minimum capacity.

SUMMARY OF THE INVENTION

The present invention (hereafter referred to as the "sequencer") solves these problems by monitoring the outputs of load sensing networks on each alternator unit, and initiating the starting sequence of the next unit to start when the load on the operating units reaches a predetermined proportion of their rating. It also will shut down the last started unit when the load is such that the remaining units will be then carrying a predetermined proportion of their rating, this proportion being less than the starting proportion above, to avoid rapid and unnecessary cycling of units.

Thus, there is provided a system comprising a plurality of separately engine-driven alternator units supplying a common electrical distribution system with one of the alternator units acting as a base unit to initially energise the system; and the system including a plurality of control units one associated with each of said alternator units, each control unit including means to monitor the power delivered by its associated alternator, means to represent the capacity of the associated alternator by a suitable analogue, means to interconnect the analogues of each control unit as each alternator is connected to the bus, and means to compare the load on its associated alternator with the analogue and to initiate the starting of the next alternator unit when the load on the alternator exceeds the set proportion of its capacity, or the removal of an alternator unit when such removal will leave the remaining unit(s) carrying a load which is a proportion of their capacity.

The load sensing networks are of commercially available types, and in particular the invention is intended for use with the Load Sensing Electric Governor Systems, although it may be adapted to other systems. The controls for automatically starting, synchronising, sharing load between and stopping alternator units (upon receipt of start and stop signals from the sequencer) are well developed commercially and do not form part of our invention.

The sequencer of the last unit is not strictly necessary, and may be omitted provided that an analogue resistor, as would be used in a sequencer if one was fitted, is installed. If a sequencer is installed in the last unit, it may be used to initiate an alarm to indicate that the connected load is approaching the combined capacity of all operating units.

The external control system may incorporate means to vary the order in which units are added and/or removed from the bus.

BRIEF DESCRIPTION OF THE DRAWINGS

FIG. 3 shows the varying load profile (upper trace) and the corresponding signal at the input (terminal 8) of each sequencer. Since the load is shared between operating units in proportion to their capacity, the signal is the same at all sequencers.

DESCRIPTION OF THE PREFERRED EMBODIMENT

Each sequencer unit comprises a means for comparing two voltage signals, an output which changes according to which of the two signals is the greater, a means of biasing one of the signals to provide a differential between the output change when one signal increases compared to when it decreases, resistances to represent the alternator unit with which the sequencer is associated, a controlled voltage output which is applied to the resistances to provide reference voltages for the comparator. One controlled voltage output is sufficient for all sequencers but for uniformity and simplicity of installation it has been included in each unit. A regulated power supply is provided by external equipment but could be built in to the sequencer if desired.

Figure 1:
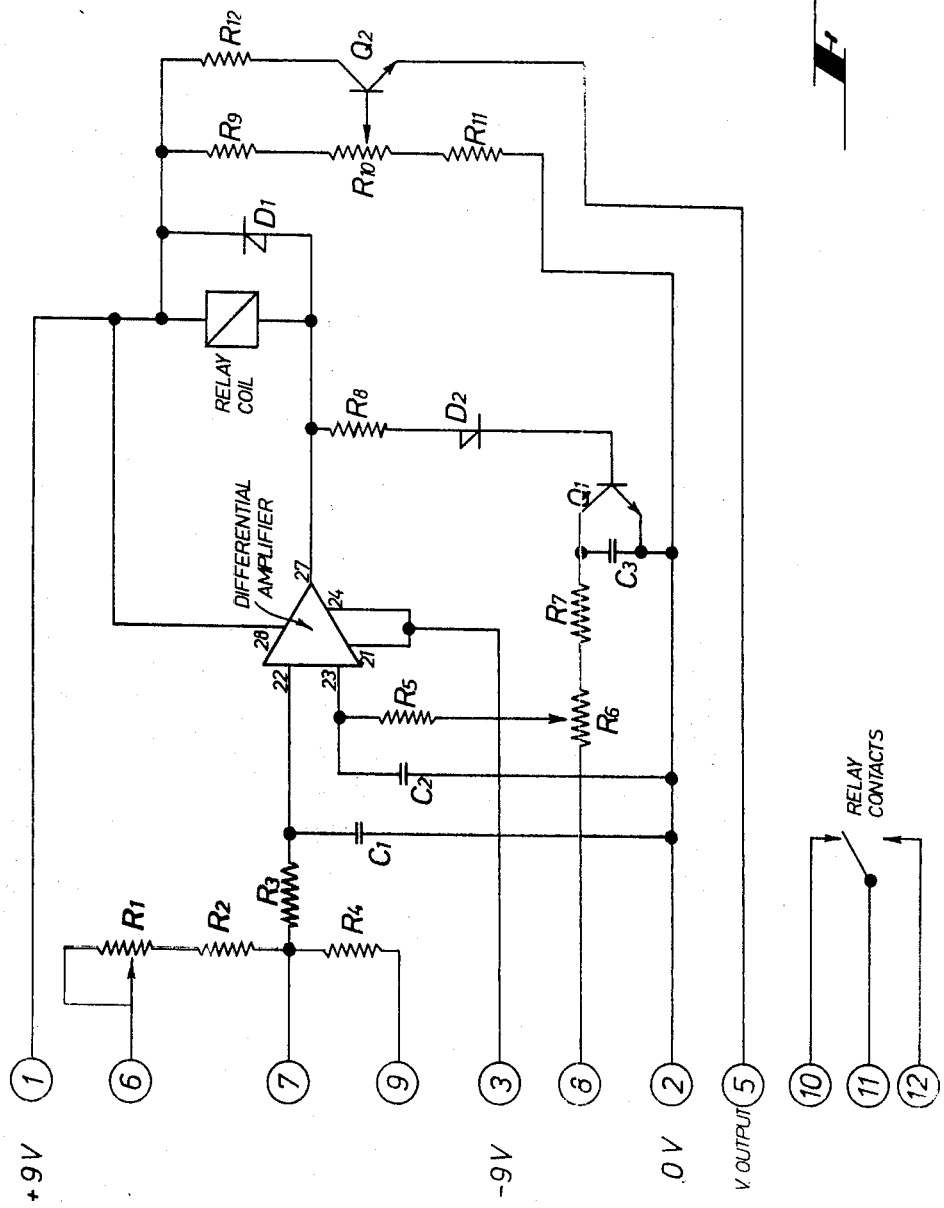
FIG. 1 shows the internal circuit of a "sequencer" unit, although the same ends could be achieved by different means, and our application is not limited to the circuit shown.

Referring to FIG. 1, regulated DC power is applied to terminals 1, 2 and 3 when the associated engine is running. Transistor Q2 with associated resistors R9, R10, R11 and R12 provides a stable voltage output at terminal 5 with respect to terminal 2. This output is applied to one end of the chain of resistors R1–R2 in this and other sequencers, refer FIG. 2. The resistors R1 and R2 form an analogue resistor the value of which corresponds to the capacity of the associated generator set.

Terminal 7 receives through the closed contact 30 of the succeeding sequencers, if any, in the starting order a voltage input according to the output of terminal 5 and the position of the sequencer in the order of operating units; if it is the last unit to have started its voltage will be that of terminal 5.

Terminal 8 is connected to the load sensing relay of the governor system, and the voltage applied to this line is proportioned to the loading of the system and when the input at terminal 8 is less than that at terminal 5, the relay coil is not energised sufficiently to operate the contacts. A small current through the coil, resistor R8 and diode D2 turns transistor Q1 "on", so that R6 and R7 form a voltage divider between terminals 8 and 2. Thus, the input at terminal 8 must be higher than that at terminal 7 for the voltages at pins 22 and 23 of the differential amplifier to be equal.

When the voltage at pin 23 of the differential amplifier exceeds that at pin 22, the amplifier connects the relay coil to terminal 3, causing the relay contacts to change over. The voltage at pin 27 of the differential amplifier is negative with respect to terminal 2, causing Q1 to turn "off". R6 and R7 no longer act as a voltage divider, and the impedance of the input of the differential amplifier is such that R3, R5 and R6 do not cause significant voltage drop. Thus the voltages at pins 22 and 23 are effectively those at terminals 7 and 8 respectively.

When the voltage at terminal 8 falls below the voltage at terminal 7 the differential amplifier reverts to its non-conducting state and the relay contacts revert to their initial position.

Thus the relay contacts will change over when the voltage at terminal 8 exceeds the voltage at terminal 7 by an amount determined by the adjustment of R6, and will change back when the voltage at terminal 8 falls below the voltage at terminal 7.

External circuitry is arranged so that when the contacts of the sequencer associated with the first alternator unit changeover, the second unit is started. Similarly, the contacts of the second unit start the third unit and so forth. When a number of units are operating and the load decreases, the first unit to be removed is commanded by the contacts of the sequencer of the next unit in order, as will be shown later.

Figure 2:
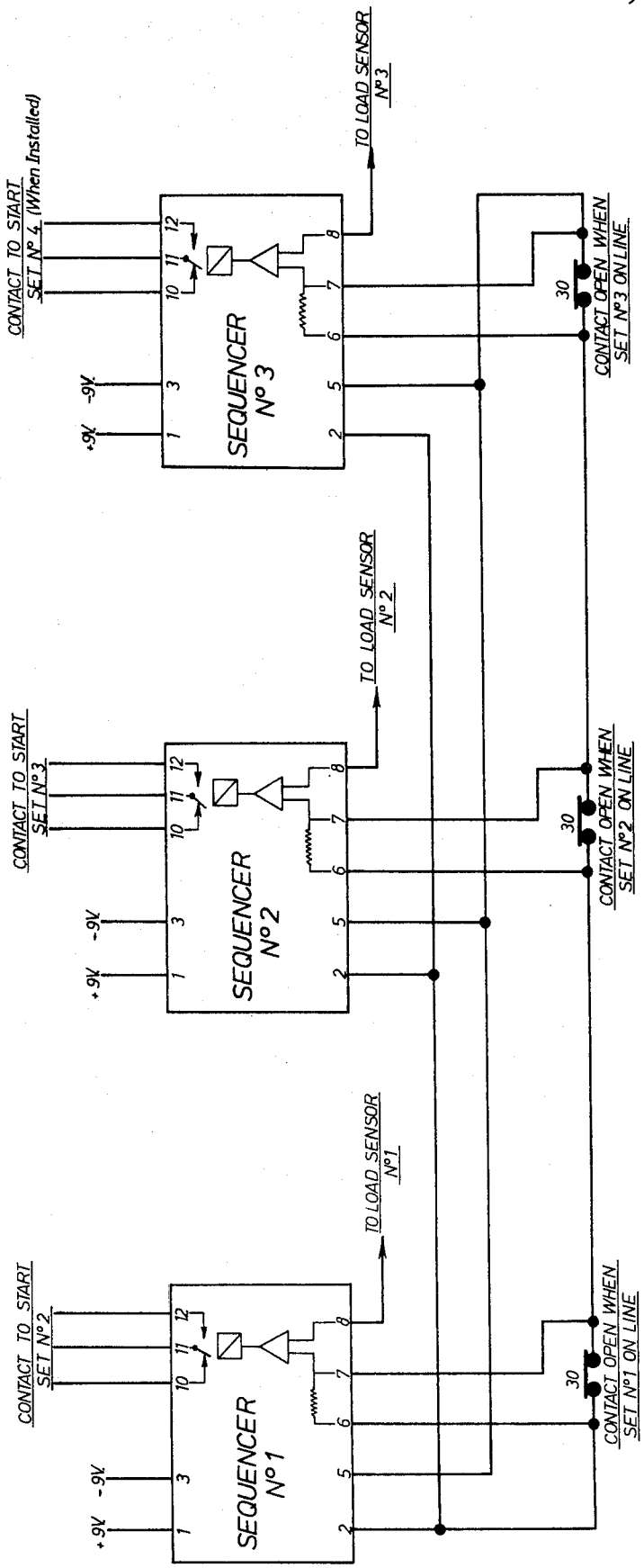
FIG. 2 shows the method of interconnecting the sequencer in a simple form.

FIG. 2 shows three sequencers connected for operation. The resistances between terminals 6 and 7 of each sequencer are adjusted to represent the capacity of the associated unit; a typical value is 10 Ohms per kilowatt. Thus, if the units were respectively 200, 300 and 200 KW capacity, the resistances would be adjusted to 2000, 3000 and 2000 Ohms.

If it is desired to start the next unit when the load on operating units reaches 90 percent of capacity, and to remove a unit when the remaining units can carry the load at 80 percent capacity, the voltage at terminal 5 of each sequencer is adjusted to 80 percent of the voltage level at terminal 8 corresponding to full load and the differential (R6) set to cause the relay to change over when the voltage at terminal 8 is 112.5 percent of the voltage at terminal 5, when terminal 5 is connected to terminal 7. Thus, if the output from the load sensing network is 5V at full load, the output from terminal 5 would be set at 4V and the differential set so that the relay picks up when the voltage at terminal 8 is 4.5V with terminals 5 and 7 connected.

FIG. 3 shows the operation of the system as the load changes from zero to 700 KW (full total load) and back.

Initially alternator unit no. 1 is started and connected to the bus. When it is first started, the output at terminal 5 is short-circuited to terminal 2 (resistors R12 limits the current to a safe value). When it is connected to the line, the contact associated with its circuit breaker or contactor opens, inserting the resistance between terminals 6 and 7 in the circuit. Thus the voltage at terminal 7 is the same as at terminal 5, i.e., 4V.

As the load increases the voltage at terminal 8 rises, until at 180 KW, it reaches 4.5V. This is sufficient to overcome the voltage divider drop (R6–R7) and apply a voltage at pin 23 of the differential amplifier greater than the 4V at pin 22. The relay operates to initiate the starting sequence of unit no. 2. At the same time, Q1 removes the voltage divider, applying 4.5 volts to pin 23 of the differential amplifier and ensuring that it remains conducting.

When unit no. 2 starts, the output from its sequencer terminal 5 is connected in parallel with that of sequencer no. 1. Since these are equal, there is no change in the voltage applied to the resistor chain; in some cases there may be occasion to use unequal voltages, in which case the highest would take control unless suitable switching arrangements were made.

When unit no. 2 is connected to the bus, its resistor (terminals 6 and 7) is connected in series with that of unit no. 1. This lowers the voltage applied to terminal 7 of unit 1 to 2/5 of 4V or 1.6V. At the same time voltage at terminals 8 of both sequencers becomes 1.8V as the sets are 36 percent loaded.

Since the voltage at terminal 8 of no. 1 sequencer exceeds that at terminal 7, the relay remains operated, keeping no. 2 set running. Since the voltage at terminal 8 of no. 2 sequencer is insufficient to cause the relay to operate, set no. 3 is not started.

When the load increases to 450 KW or 90 percent of the combined capacity, unit no. 3 is started in a similar manner to the preceding, and when the load increases 630 KW or 90 percent of system capacity sequencer no. 3 calls for a fourth unit. As there is no fourth unit, this signal can be used to give an alarm. This is particularly useful as one of the units may be out of service for any of a number of reasons. If external circuitry is arranged so that in the event, say unit no. 2 is out of service, sequencer no. 1 starts unit no. 3, then when the load reaches 90 percent of their combined capacity an alarm will be raised which can automatically initiate load shedding procedure and/or alert operators so that unit 2 may be returned to service or load shed manually as required.

With all 3 units operating the voltages at terminal 7 of their sequencers are respectively 1.14, 2.85 and 4V (approx.). When the load falls to 560 KW (80 percent of capacity) the voltage at terminal 8 falls to 4V and the relay of sequencer 3 drops out, removing the alarm.

When the load falls to 400 KW or 57 percent of capacity the voltage at terminal 8 falls to 2.85V (57 percent of 5V.) Since this is the same as the voltage at terminal 7 of sequencer no. 2, its relay drops out and set 3 is removed from the bus.

This leaves the load of 400 KW carried by sets 1 and 2 with a total capacity of 500 KW i.e., the sets are operating at 80 percent capacity.

As the circuit breaker opens, the resistance between terminals 6 and 7 of sequencer no. 3 is shorted. Thus terminal 7 of sequencer 2 is at 4V and terminal 7 of sequencer 1 at 1.6V.

As the load decreases further, at 160 KW, the voltage at terminals 8 will fall to 1.6V whereupon sequencer no. 1 removes unit no. 2 from the bus, leaving unit no. 1 carrying 80 percent of its capacity.

Unit 1 is not controlled by the sequencers, as it will normally remain in operation at all times to maintain power to the bus.

The above system may be extended to include any number of alternator units, each with its associated sequencer (except that, as previously stated, it is not strictly necessary for the last unit in a series to have a complete sequencer). The units may be of any capacity, equal or unequal.

Whilst it has been initially designed for use with the Woodward type 2301 electric governor system, it may be adapted to operate in conjunction with other types of governor systems and load sensing networks, or in fact to be built into complete systems with such equipment.

I claim:

1. Control apparatus for energizing an electrical distribution system from a plurality of separately engine-driven alternators, at least one of the alternators serving as a base alternator initially energizing the distribution system, said control apparatus comprising a plurality of control units, one control unit associated with each alternator, and each control unit comprising:
   a. monitoring means for monitoring the electrical power being delivered by the associated alternator to the distribution system;
   b. analogue circuit means representing the capacity of the associated alternator by a suitable analogue;
   c. interconnecting means for interconnecting the analogue circuit means of each control unit into a composite analogue system whenever the associated alternator is connected into the distribution system at any time, affording a composite analogue system continuously representative of the capacity of those alternators which are actually in operation,
   d. and comparison means, comparing the load upon the associated alternator unit with the composite analogue system, for initiating starting of the next alternator when the load on the associated alternator exceeds a set proportion of its capacity, and for initiating removal of an alternator when such removal will leave the remaining alternators carrying a load of a set proportion of their capacity.

2. A control apparatus as defined in claim 1, wherein each analogue circuit means comprises a variable resistor which is adjustable to represent the capacity of the associated alternator.

3. A control apparatus as defined in claim 1, wherein each comparison means comprises a differential amplifier actuating a relay to connect or remove the associated alternator from the distribution system.

4. A control apparatus as defined in claim 2 wherein the interconnecting means comprises switch means to connect the analogue resistors in series as each alternator is connected to the distribution system, the analogue resistors thus producing a total resistance proportional to the total capacity of the alternators in operation, so that the signal produced by the analogues is proportional to the capacity of the alternators in operation.

* * * * *